United States Patent
Wilczek

(10) Patent No.: US 11,643,121 B2
(45) Date of Patent: May 9, 2023

(54) SYSTEM AND METHOD FOR NAVIGATING WITHIN A TRACK NETWORK

(71) Applicant: Track Machines Connected Gesellschaft m.b.H., Linz (AT)

(72) Inventor: Krzysztof Wilczek, Vienna (AT)

(73) Assignee: Track Machines Connected Gesellschaft m.b.H., Linz (AT)

(*) Notice: Subject to any disclaimer, the term of this patent is extended or adjusted under 35 U.S.C. 154(b) by 279 days.

(21) Appl. No.: 16/758,228

(22) PCT Filed: Oct. 9, 2018

(86) PCT No.: PCT/EP2018/077423
§ 371 (c)(1),
(2) Date: Apr. 22, 2020

(87) PCT Pub. No.: WO2019/091681
PCT Pub. Date: May 16, 2019

(65) Prior Publication Data
US 2020/0283040 A1    Sep. 10, 2020

(30) Foreign Application Priority Data

Nov. 9, 2017  (AT) .................................. A 437/2017

(51) Int. Cl.
*B61L 27/50*  (2022.01)
*B61L 27/04*  (2006.01)
(Continued)

(52) U.S. Cl.
CPC ............... *B61L 27/50* (2022.01); *B61L 27/04* (2013.01); *B61L 27/40* (2022.01); *B61L 27/70* (2022.01)

(58) Field of Classification Search
CPC ...... B61L 27/50; B61L 23/042; B61L 25/025; B61L 27/04; B61L 27/40; B61L 27/70;
(Continued)

(56) References Cited

U.S. PATENT DOCUMENTS

| 5,791,063 A | 8/1998 | Kesler et al. |
| 9,169,603 B2 | 10/2015 | Oberlechner |

(Continued)

FOREIGN PATENT DOCUMENTS

| AT | 518692 A1 * 12/2017 ............... B61K 9/08 |
| CN | 102069824 A    5/2011 |

(Continued)

OTHER PUBLICATIONS

Indian Examination Report in Indian Application No. 202027012321 dated Mar. 17, 2022.
(Continued)

*Primary Examiner* — Michael J Zanelli
(74) *Attorney, Agent, or Firm* — Collard & Roe, P.C.

(57) ABSTRACT

A system for navigating within a track network includes, as system components, a system central, a track maintenance machine and a communication device. The system central is set up for administering network data representing a model of the track network. The track maintenance machine is suited for treatment of track sections of the track network. The track maintenance machine includes a navigation device for processing navigation data derived from the network data. The communication device is provided for data exchange between the system central and the navigation device. The system includes at least one movable or stationary carrier platform with sensors for collecting raw data representing characteristic information of the track network. A big data framework is set up in the system central to evaluate the raw data and synchronize them with the net-
(Continued)

work data. Automated updating of the network data can be carried out with the system.

7 Claims, 3 Drawing Sheets

(51) Int. Cl.
    *B61L 27/40*         (2022.01)
    *B61L 27/70*         (2022.01)

(58) Field of Classification Search
    CPC ..... B61L 15/0027; B61D 15/00; G01C 21/20; B61K 9/08; Y02T 10/72; B61C 17/12
    See application file for complete search history.

(56) References Cited

U.S. PATENT DOCUMENTS

| | | |
|---|---|---|
| 9,522,686 B2 | 12/2016 | Beer |
| 10,457,305 B2 | 10/2019 | Braband |
| 2007/0213926 A1 | 9/2007 | Jager |
| 2009/0177401 A1 | 7/2009 | Otsubo et al. |
| 2010/0004804 A1 | 1/2010 | Anderson et al. |
| 2012/0179309 A1* | 7/2012 | Wilson ................ G06F 16/951 701/19 |
| 2014/0156123 A1* | 6/2014 | Cooper ................ G01S 19/50 701/19 |
| 2014/0176711 A1 | 6/2014 | Kirchner et al. |
| 2014/0277824 A1 | 9/2014 | Kernwein et al. |
| 2015/0025714 A1 | 1/2015 | Beer |
| 2016/0159381 A1 | 6/2016 | Fahmy |
| 2019/0136462 A1* | 5/2019 | Buerger ................ B61K 9/08 |

FOREIGN PATENT DOCUMENTS

| | | |
|---|---|---|
| CN | 103221291 A | 7/2013 |
| CN | 103465938 A | 12/2013 |
| CN | 104220673 A | 12/2014 |
| CN | 104865589 A | 8/2015 |
| DE | 102012215533 A1 | 3/2014 |
| DE | 102012219111 A1 | 4/2014 |
| DE | 102013010787 A1 | 12/2014 |
| EP | 1862593 A2 | 12/2007 |
| EP | 1 972 894 A1 | 9/2008 |
| EP | 2 894 074 A1 | 7/2015 |
| JP | 2008195395 A1 | 8/2008 |
| WO | 2014/184253 A2 | 11/2014 |
| WO | 2017/008978 A1 | 1/2017 |

OTHER PUBLICATIONS

Austrian Office Action in Austrian Application No. A 437/2017 dated Sep. 13, 2018 with English translation.
International Preliminary Report on Patentability in PCT/EP2018/077423 dated Oct. 8, 2019.
Chinese Office Action in Chinese Application No. 201880072422.6 dated Feb. 27, 2023 with English translation.

* cited by examiner

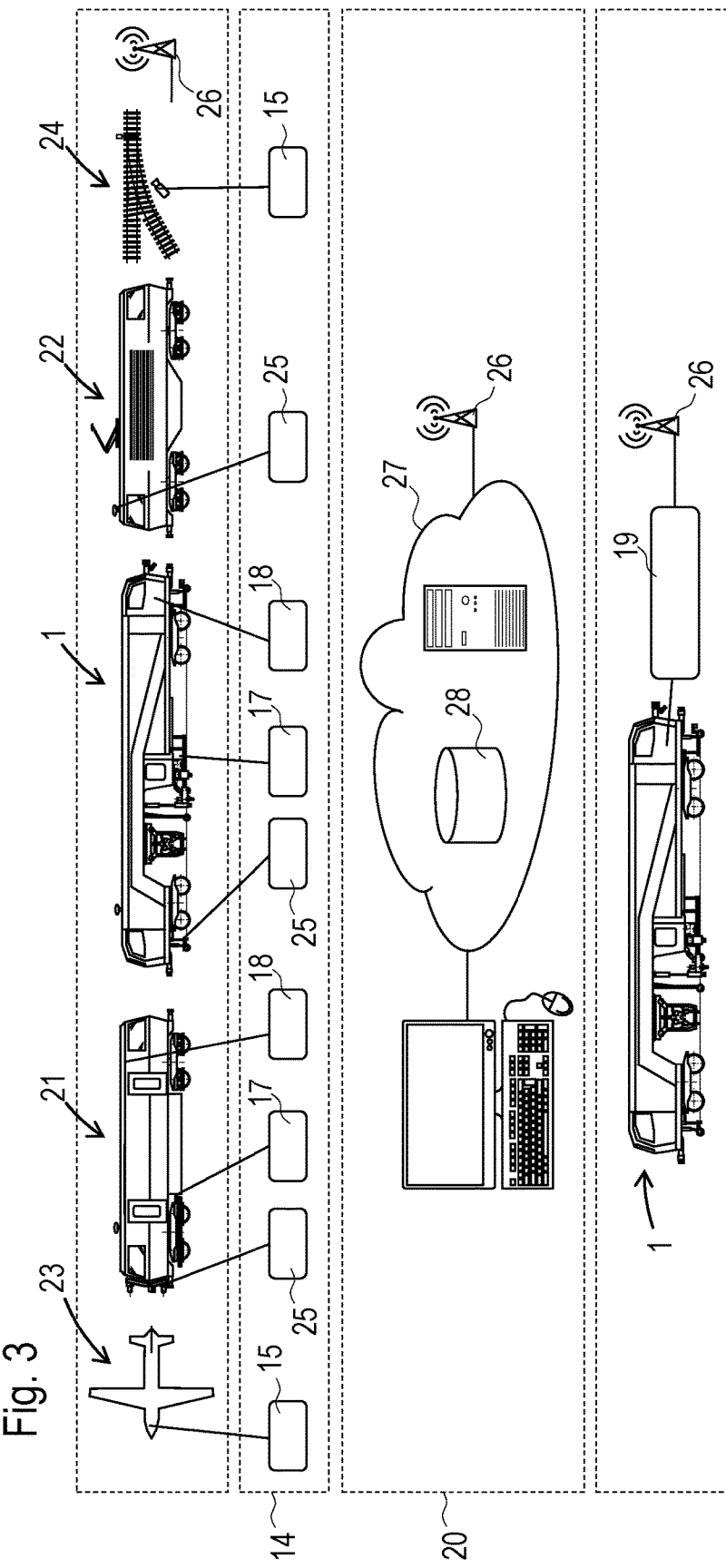
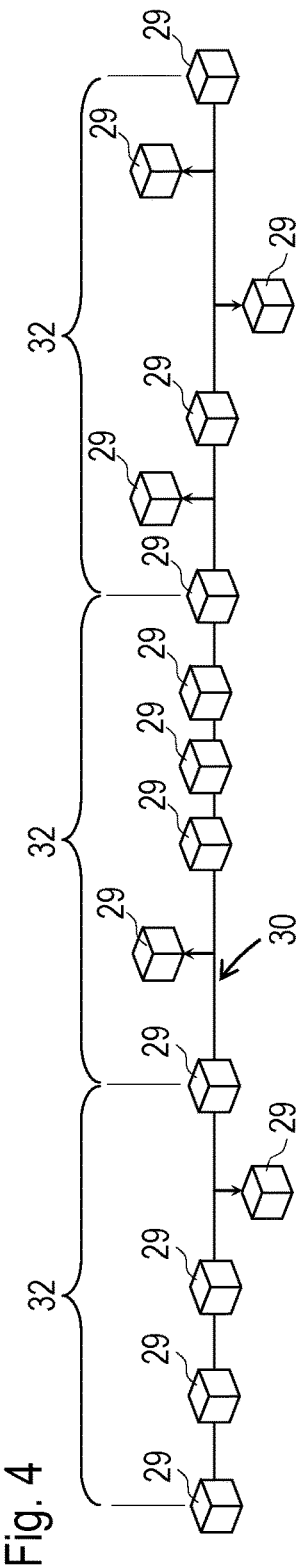

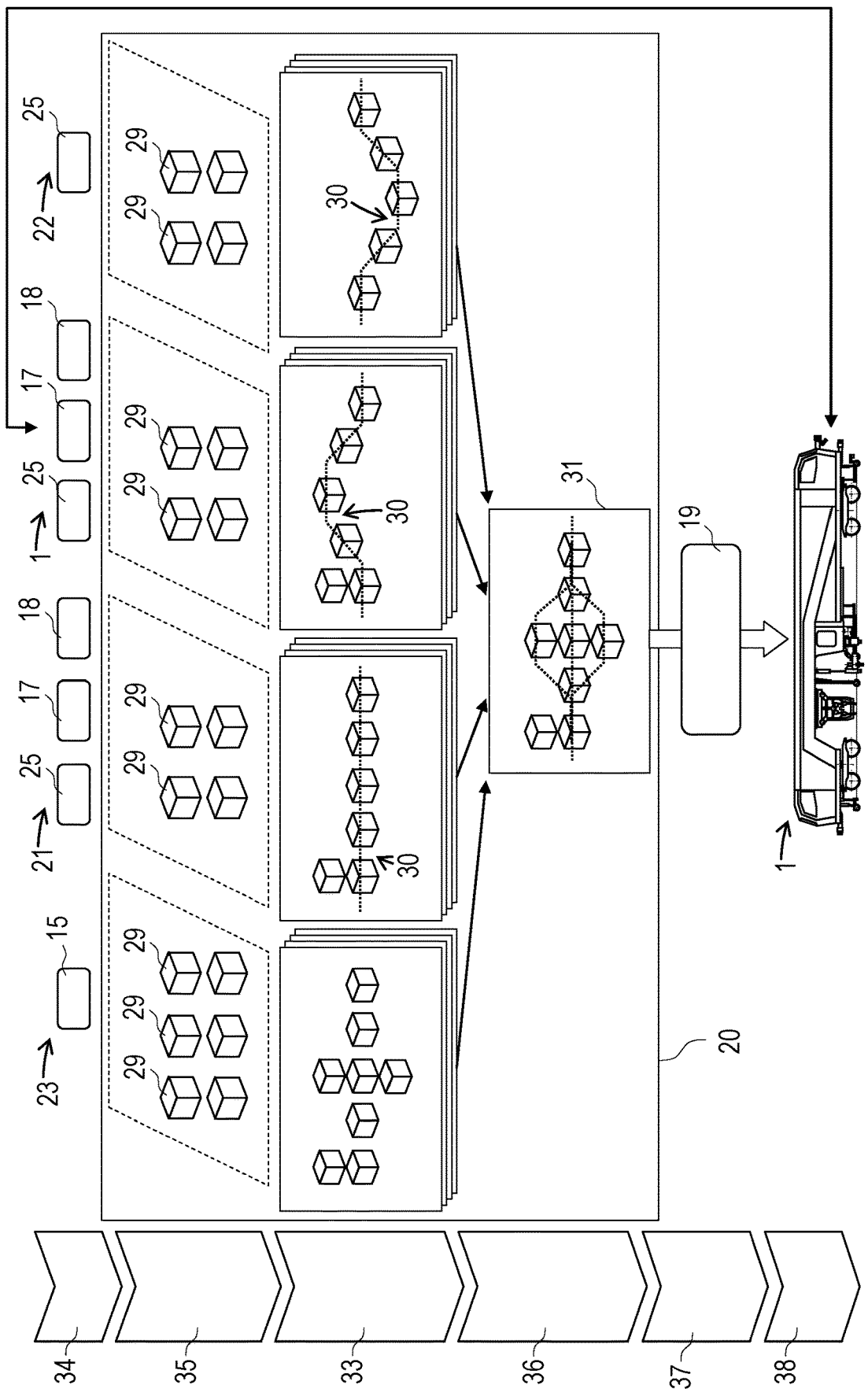

SYSTEM AND METHOD FOR NAVIGATING WITHIN A TRACK NETWORK

BACKGROUND OF THE INVENTION

Field of the Invention

The invention relates to a system for navigating within a track network, comprising as system components a system central, a track maintenance machine and communication means. The system central is set up for administering network data which represent a model of the track network. The track maintenance machine is suited for the treatment of track sections of the track network, wherein the track maintenance machine comprises a navigation device for processing navigation data derived from the network data. The communication means are provided for data exchange between the system central and the navigation device. In addition, the invention relates to a method of operating the system.

DESCRIPTION OF THE RELATED ART

Navigation within a track network is required for the operation of track maintenance machines. Initially, operational plans including operating locations and work orders are compiled manually or in a partially automated way in a system central. Then, a transfer of operating plan lists to the track maintenance machine takes place in order to specify the defined operating locations as navigation targets. As a rule during this, it is assumed that a machine operator knows the local circumstances.

According to EP 1 862 593 A2, a system is known which enables an automatized localization of a track maintenance machine within a track network by means of a satellite-based tracking system. In this, synchronization with characteristic data of a track line database takes place in order to make a precise position determination.

In the course of construction site planning, it may happen that an operating location is not clearly defined or is indicated incorrectly. For example, an invalid reference may be noted in the operating plans. Such mistakes can lead to a delay in work execution. In the worst case, an operation takes place on a wrong track section.

According to the prior art, operating plans are compiled on the basis of network data which are stored in several different databases. In this, the databases in each case concern different installations within the track network (for example, signalling equipment, track, catenaries, etc.). These databases are tailored to the respective requirements of the various planning authorities of a railway infrastructure operator, wherein, as a rule, different references (for example, mileage, signs for masts, sleepers, signalling device etc.) are stored to indicate an operating location.

If the track network is changed, such as, for example, when a switch is removed, the network data in the known databases have to be updated manually. In practice, there are frequently problems with the consistency, completeness, validity and precision of the available network data. In further sequence, the deficient data maintenance leads to faulty operation planning of the track maintenance machine.

SUMMARY OF THE INVENTION

It is the object of the invention to provide an improvement over the prior art for a system and for a method of the type mentioned at the beginning.

According to the invention, these objects are achieved by way of the features of the independent system and method claims. Advantageous further developments of the invention become apparent from the dependent claims.

In this, it is provided that the system comprises at least one movable or stationary carrier platform with sensors for collecting raw data which represent characteristic information of the track network, and that a big data framework is set up in the system central in order to evaluate the raw data and synchronize them with the network data.

In this manner, the network data are continuously adjusted to a detected actual state. In this, the setup of the big data framework in the system central enables an automatized evaluation of the collected raw data on the basis of pre-set evaluation criteria or -algorithms. During this, not only conventional databases and data analysis tools are used, but also various processes of machine learning. In this manner, a model of the track network is constructed on the basis of the collected raw data and continuously further developed. Based on the model and a sensor system installed on the track maintenance machine, an automatized real-time position determination in takes place. In addition, work parameters can be pre-defined independent of location.

In this, it is advantageous if the track maintenance machine is designed as a carrier platform and comprises a sensor system which collects raw data during travel on the track network. Thus, the network data become ever more precise solely by increasing operational use of the track maintenance machine, so that accurate operational planning is ensured.

In addition, it is useful if the system comprises as carrier platform a measuring vehicle or other track-bound vehicle equipped with sensors. As a rule, a track network is traveled over at prescribed time intervals by a measuring vehicle in order to establish an actual condition. In case of integration into the present system, the raw data collected by means of the measuring vehicle also serve for updating the network data. Conventional rail vehicles may also be equipped with sensor systems for this purpose.

A further improvement provides that the system comprises a flying carrier platform, in particular a drone equipped with sensors. Also, high-resolution satellite images can be used as raw data in order to augment the network data with information.

In an advantageous embodiment of the invention, the network data are stored as a graph with track objects as nodes and with relations between the track objects as edges. In this way, the network data can be administered in a simple manner. In particular, the synchronization with the evaluated raw data is facilitated by suitable algorithms.

In this, it is favourable if characteristic data patterns are specified for a track object. Basis for this are significant features common to every object in a certain class (for example, sleepers, rail fastening means, light signals, etc.). As a consequence, depending on the sensors used, corresponding data patterns are found in the raw data which ensure an efficient object allocation.

The method, according to the invention, for operating one of the afore-mentioned systems provides that the raw data are collected by means of the sensors, that the raw data are transmitted to the system central, that object data are generated from the raw data by means of identification algorithms, and that the network data are synchronized with the object data in order to update the network data.

In this, the big data framework set up in the system central serves for automatic evaluation of the collected raw data. With this method, an automatized adaptation of the network data takes place as soon as corresponding raw data are collected by means of the sensors. Thus, problems based on deficient data maintenance are precluded.

In a favourable further development of the method, after an update of the network data has taken place, all the updated data or part of the updated data are transferred to the navigation device of the track maintenance machine. If the system encompasses several track maintenance machines, a corresponding data transfer takes place to all machines. In this way, the navigation to the next operating location is always based on updated network data.

An advantageous embodiment of the method provides that probability values or probability functions are assigned to the object data in each case in dependence on the sensors used and/or the carrier platform used and/or the identification algorithms used. In this manner, an identification precision in relation to the data stock or the track network is ascertained. Thus, a classification of the determined objects takes place with respect to their information content for the track network or for the already existing track network information.

The machine learning in the scope of the big data framework enables the continuous expansion and adaptation of the recognizable objects on the basis of new raw data. For example, definitions or algorithms deposited in an object register are updated with new data.

In this, it is favourable if an update of the network data by new object data is carried out in dependence on the assigned probability values or probability functions. The network data are thus brought up-to-date in that new object data are added on the basis of the evaluated information content.

A further improvement provides that the object data are organized on the basis of a detected motion pattern of the carrier platform, so that track objects represented by the object data, strung together as an object chain, are supplied for the synchronization with the network data stored as a graph. This simplifies the synchronisation because, due to the detected motion pattern, a logical sequencing of several track objects takes place. Thus, the significance of an object chain with complex structure is derived from the significance of the individual track objects.

Advantageously in this, the object chain is subdivided into segments, wherein a segment is synchronized with the graph on the basis of distinctive track objects. This method step likewise optimizes the synchronization of the network data with the object data.

A simple to carry out synchronization of a segment with a partial graph provides that an extent of agreement is specified, and that the partial graph is replaced by the segment if the extent of agreement exceeds a pre-set minimum extent.

The fault tolerance of the method is heightened if, when synchronizing a segment to a partial graph, a non-verifiable track object remains as node of the partial graph until a pre-set number of failed verifications has been reached. In this manner, sensor- or transmission defects have no influence on the quality of the network data.

For a navigation procedure, it is advantageous if surrounding track objects are recorded by means of sensors arranged on the track maintenance machine, and if a current position of the track maintenance machine is determined by synchronization of the recorded track objects with the network data. In this, changes of the track network are automatically taken into account during navigation of the track maintenance machine.

BRIEF DESCRIPTION OF THE SEVERAL VIEWS OF THE DRAWING

The invention will be described below by way of example with reference to the accompanying drawings.

DETAILED DESCRIPTION OF THE INVENTION

Figure 1:
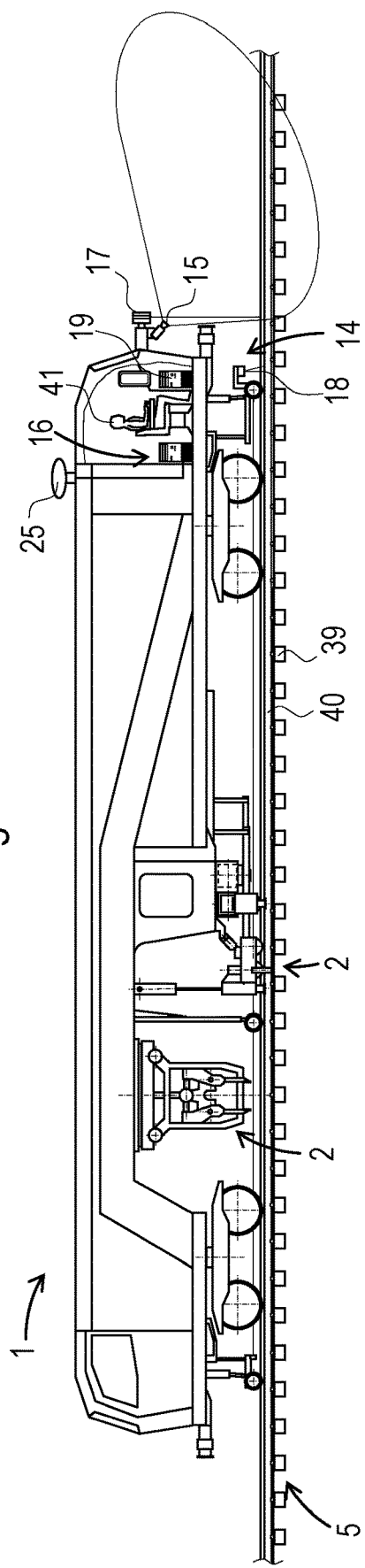
FIG. 1 track maintenance machine
FIG. 2 track network
FIG. 3 system layout
FIG. 4 structure of track sections
FIG. 5 method sequence
Figure 2:
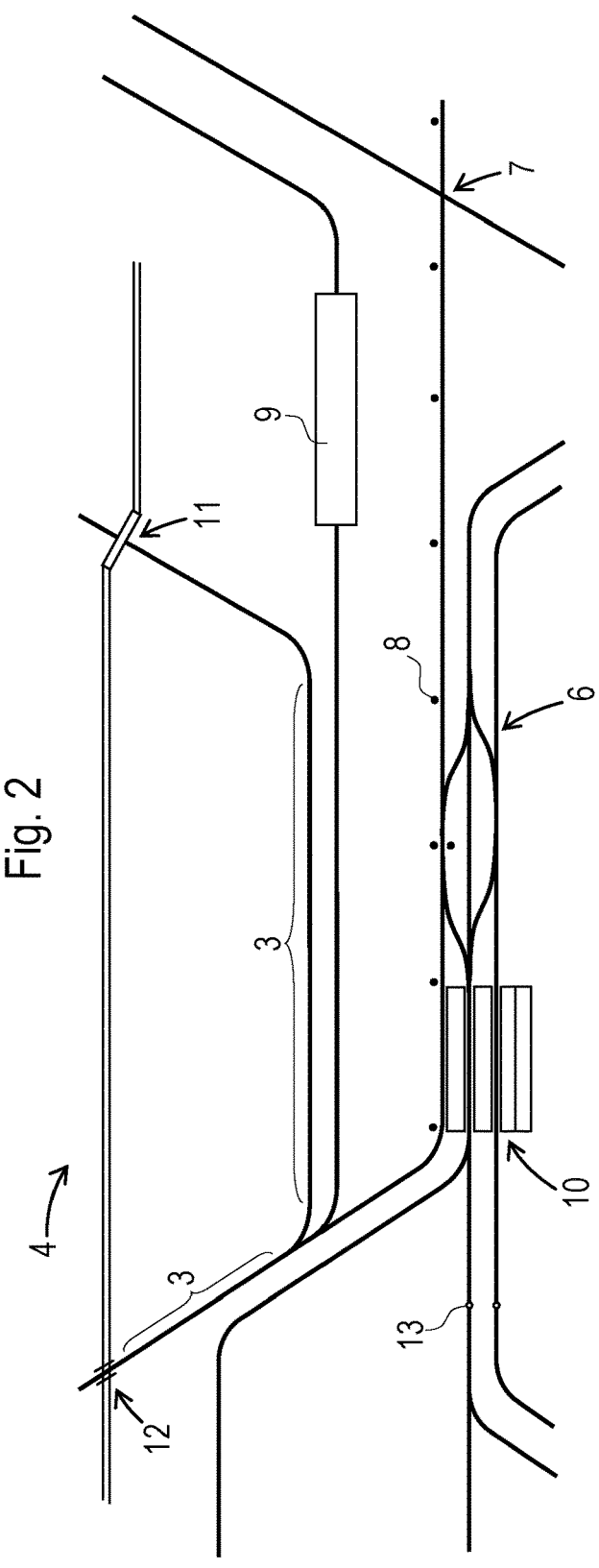

A track maintenance machine 1 shown in FIG. 1, which is to be navigated to a work assignment, is a component of the system according to the invention. This track maintenance machine 1 comprises working units 2 for treatment of a track section 3 of a track network 4. The track network 4 includes various objects such as, for example, tracks 5, switches 6, crossings 7, masts 8, tunnels 9, stations 10, underpasses 11, level crossings 12 or balises 13, as shown by example in FIG. 2.

The track maintenance machine 1 is further equipped with various sensors or sensor systems 14 in order to record the surroundings of the track 5 traveled upon, and the current position. These are, for example, a camera 15, a positioning system 16, a clearance gauge scanner 17 or a rail scanner 18. In this manner, the track maintenance machine 1 functions as a carrier platform for the sensors or sensor systems 14.

In order to get to a track section 3 to be worked on, the track maintenance machine 1 has a navigation device 19. This is configured as a computing- and controlling unit and serves for navigation within the track network 4 which is represented by network data. By means of the navigation device 19, navigation data derived from the network data are processed and synchronized with sensor data in order to determine the current position of the track maintenance machine 1.

One object of the present invention is to continuously update the network data in an automatized way. To that end, at raw data representing characteristic information of the track network 4 are first collected by means of the sensors or sensor systems 14. In further sequence, the raw data are evaluated and synchronized with the network data administered in a system central 20. From this data synchronization it is possible to draw conclusions with regard to the condition of the track network 4 or individual track sections 3. For example, a frequent change of collected position data allows conclusions as to an unstable track position.

Besides the track maintenance machine 1, other carrier platforms can be used for collecting the raw data, for example a measuring vehicle 21, another rail vehicle 22 or a flying carrier platform 23. Infrastructure facilities equipped with sensors 14 can be used as a stationary carrier platform 24. This might be, for example, a mast 8 with a camera 15 fastened to it which observes a track section 3. Also, fibre optic cables installed adjacent to the track 5 can be used as sensors 14. The basis for this is the so-called Distributed Acoustic Sensing (DAS) in which laser impulses are sent through fibre optic cables in order to thus register in real time along a track section 3 sound signals and activities which can be derived therefrom. By means of such stationary carrier platforms 24, raw data of an observed track section 3 are collected over time. Aside from detecting object changes, these raw data can also be used for position verification of moving carrier platforms 1, 21, 22, 23.

The measuring vehicle 21 is equipped, for example, with a GNSS receiver 25, a clearance gauge scanner 17 and a rail scanner 18. The other rail vehicle 22 includes a GNSS receiver 25, and the flying carrier platform 23 comprises a camera 15 or other devices for recording aerial views. By means of all these sensors or sensor systems 14, various raw data are collected and supplied for evaluation. In this, depending on data volume and available computing power, the raw data are either pre-processed on the carrier platform 1, 21, 22, 23, 24 or transmitted directly to the system central 20.

As can be seen in the illustrative system layout in FIG. 3, communication means 26 are provided as additional system components. These communication means 26 serve for data exchange between the system central 20, the sensor systems 14 and the navigation device 19. These means are, for example, devices for wireless communication via a mobile radio network. In a very simple embodiment of the system according to the invention, the system central 20 is accommodated in the track maintenance machine 1, so that there is a self-sufficient system for navigation and network data updating. In this, the communication means 26 may be elements of an installed bus system.

In the system central 20, a big data network 27 is installed. This also supports various machine learning algorithms besides conventional databases 28 and data analysis tools. Examples for this are noSQL or Hadoop. In this manner, the system central 20 serves for collecting, storing and processing the data.

From data points $m_{r,s}^i(t)$, the sensor systems 14 generated a data tensor $S_k(t)$ with an arbitrary dimension k at a point in time t:

$$S_k(t) = (M_1(t), \ldots, M_k(t))$$

wherein i=1, . . . , k are $M_r r \times s$—are matrixes, therefore $$M_i(t) = \begin{pmatrix} m_{1,1}^i(t) & \ldots & m_{1,s}^i(t) \\ \vdots & \ddots & \vdots \\ m_{r,1}^i(t) & \ldots & m_{r,s}^i(t) \end{pmatrix}$$

Sensors 14 arranged on moving carrier platforms 1, 21, 22, 23 deliver in particular data points $m_{r,s}^i(t)$ with spatial information. In stationary carrier platforms 24, however, the data points recorded by means of sensors 14 display especially temporal changes.

From characteristic features in the data points $m_{r,s}^i(t)$ of the sensor systems 14, virtually indexed objects 29 (objekt$_i$) are compiled as object data. These represent track objects 4-13 which are recognizable with stochastic reliability in the track environment and can serve as reference for navigation. Specifically, the objects 29 are characterized by significantly reproducible patterns. In an object register, the definitions (or algorithms) of the objects 29 are updated by new data.

During this, a probability is calculated for each object characteristic or a probability function $P_x$ is assigned:

$$objekt_{vi}(t) = \begin{pmatrix} objekt\ id & P_{id} \\ time\ t & P_t \\ coordinates\ x, y, z & P_{x,y,z} \\ offset\ \Delta x, \Delta y, \Delta z & P_{\Delta x, \Delta y, \Delta z} \\ value\ \Delta t & P_{\Delta t} \\ next\ objekt\ O_{i+1} & P_{O_{i+1}} \\ \Delta t_{O_{i+1}} & P_{\Delta t_{O_{i+1}}} \\ data\ points\ M_1 & P_{M_1} \\ \ldots & \ldots \\ data\ points\ M_x & P_{M_x} \end{pmatrix}$$

Aside from the metadata resulting from the object verification, the data points in particular describe a current state of the virtually indexed object 29.

The respective probability function P is dependent on the type of sensor or sensor system 14, the type of carrier platform 1, 21, 22, 23, 24 and the algorithms in the object register. For example, a probability function with little scattering is prescribed for newer sensor systems 14. For older sensors 14 with less precision, however, a greater scattering is prescribed. A recognition probability derived from stored observation processes takes into account the number of objects 29 recognized so far. In this way, a degree of unambiguousness of an object 29 in relation to a data stock stored in the system central 20 is established. Accordingly, a classification of the objects 29 by means of the evaluated information content takes place with respect to the total track network and the information therein.

In addition, the evaluation method is continuously improved in that the recognizable objects 29 are continuously expanded and adapted by means of machine learning or manual learning. In this, the autonomous machine learning within the big data framework is based on those data which are newly collected in the system central 20.

As shown in FIG. 4, virtually indexed objects 29 are linked relative to one another according to a motion pattern of the carrier platform 1, 21, 22. Thus, in the case of track-bound carrier platforms 1, 21, 22 strung-together virtually indexed objects 29 are generated, wherein the resulting object chain 30 can be regarded as a semantic chain $K_{t_n}$:

$$K_{t_n} = (objekt_{vi}(t_n), \ldots, objekt_{vi}(t_{n+m})),$$

wherein $t_n$ is a starting time and $t_{n+m}$ is an ending time of a run of the carrier platform 1, 21, 22.

Within this chain, distinctive objects 29 (for example, object data of a switch 6) are specified as discretization points for subdivision into segments 32. These can be determined dynamically, from the probability of recognition or from the relevancy in the network (degree of unambiguousness). In FIG. 4 for example, the strung-together objects 29 represent, from left to right, a switch 6, a balise 13, a track 5, a mast 8, a tunnel portal, a tunnel 9, a tunnel portal, a switch 6, a mast 8, a balise 13, two masts 8, and a switch 6.

New object chains 30 are synchronized with the network data, i.e. the model 31 of the track network 4. In this, the network data are stored as a graph $N(t_a)$, wherein $t_a$ is a time of updating of the particular object 29:

$$N(t_a) = (objekt_v(t), edge_v(t))$$

$$N(t_{new}) = objekt_{vi}(t) \rightarrow N(t_{old})$$

Segments 32 of the object chain 30 are synchronized with the model 31 of the track network 4 (mapped) via distinctive objects 29. If a segment 32 and a partial graph coincide with a high probability, then the virtually indexed objects 29 contained in the segment 32 are transferred to the graph. In this manner, the characteristics of the particular virtually indexed object 29 are used for updating the characteristics of the model 31 (update of the network data) while taking into account the associated probability functions P. In this, with growing collection of raw data, the reliability and precision of the network data increases:

$$N(t_a) = \left( \begin{pmatrix} objekt\ id & P_{id} \\ update\ t_a & P_{t_a} \\ coordinates\ x, y, z & P_{x,y,z} \\ value\ d & P_d \\ data\ points\ M_1 & P_{M_1} \\ \ldots & \ldots \\ data\ points\ M_x & P_{M_x} \end{pmatrix} \begin{pmatrix} next\ objekt\ O_{v+1} & P_{O_{v+1}} \\ distance\ next\ objekt\ x, y, z & P_{x,y,z} \\ \ldots & \ldots \end{pmatrix} \right)$$

Data points collected by means of stationary carrier platforms 24 are also synchronized in a corresponding manner with the network data, wherein here the information about temporal changes is paramount.

During an updating process, it may happen that, based on sensor faults or obstructions during object detection, individual objects 29 cannot be verified. Then it is practical if these remain existent in the network data until—during a new collecting procedure 33—a falsification takes place, or a verification fails to happen several times.

Shown FIG. 5 is the method sequence in an overview. In this, the method is divided roughly into the following method steps:
- input 34 of the various carrier platforms 1, 21, 22, 23, 24 and the sensor systems 14
- signal analysis 35 for object indexing with statistical values
- repeated collecting procedures 33 (observations) for verification or falsification of the object indexing
- mapping 36 of various collection types or observation perspectives
- output 37 of the track network model 31 (updated network data)
- navigation procedure 38 of a track maintenance machine 1

In an initial phase, the system forms an initial model 31 for the track network 4 on the basis of the pre-set algorithms. To that end, for example, aerial views, raw data of a measuring vehicle 21, raw data of the track maintenance machine 1 and raw data of another vehicle 22 are evaluated. In FIG. 5, the respective signal analysis 35 initially results in different objects 29 or object classes which can be associated with individual track objects 5-13. In aerial views, these are, for example, tracks 5, switches 6, tunnels 9, masts 8, stations 10, etc. The raw data of the track-bound carrier platforms 1, 22, 23 can be associated with the track objects tracks 5, switches 6, tunnels 9, etc.

In the course of the repeated collecting procedures 33, the individual objects 29 are verified or falsified with regard to their relation to one another. In the case of the track-bound carrier platforms 1, 22, 23, object chains 30 are formed which depict a track section 3 traveled upon. A merging of these evaluation results by means of mapping 36 results at last in the model 31 of the recorded track network 4.

For reliably carrying out a navigation procedure 38, the network data are transmitted from the system central 20 to the navigation device 19 of the track maintenance machine 1 after a data update has taken place or at prescribed time intervals. In this, it is favourable if, via the desired confidence, it is parameterized which objects 29 contained in the network data are transmitted for navigation to the track maintenance machine 1.

During the navigation procedure 38 itself, objects or object data 29 are synchronized with those track objects 5-13 which are currently detected in the surroundings of the track maintenance machine 1 by means of the sensors or sensor systems 14. In this way, detected track objects 5-13 serve as reference for position determination. Additionally, results of a track gauge measurement can be used for more precise positioning on the track 5. In this, the detected progression of the track gauge forms further data points of those objects 29 which represent the corresponding track 5. In an extension, it is also possible to use detectable characteristic features of sleepers 39 or rails 40 (markings, material characteristics, etc.).

Additionally, the raw data collected during the navigation process 38 serve as new data input for updating the network data. With the present system, changes in the track network 4 due to reconstruction or malfunctions are automatically taken into account for subsequent navigation procedures 38.

Cognition takes place cause- or time-related automatically in dependence on the speed of migration of the track network 4.

Favourably, recognized and anticipated objects 29 in the current surroundings of the track maintenance machine 1 are displayed to a machine operator 41 for orientation. Work instructions can additionally be included in this display. Also, work parameters can be prescribed to the machine operator 41 in a location-dependent way or transmitted directly to a working unit 2. In this way, an automatized local adaptation of work parameters takes place, thus enabling an optimized operation of the track maintenance machine 1. In a tamping machine, these are, for example, lifting- and lining values as well as time stipulations for the tamping cycles. In other track maintenance machines 1, work parameters like ballast demand, spoil quantities of old ballast can be adjusted dependent on location.

The invention claimed is:

1. A method of operating a system for navigating within a track network, the method comprising the following steps:
   providing a system central for administering network data representing a model of the track network;
   providing a rail vehicle including a navigation device for processing navigation data derived from the network data;
   providing a communication device for data exchange between said system central and said navigation device;
   providing a carrier platform with sensors;
   using said sensors to collect characteristic information of raw data representing the track network;
   transmitting the raw data to said system central;
   generating object data from the raw data by using identification algorithms;
   synchronizing the network data with the object data to update the network data; and
   assigning probability values or probability functions to each object data in dependence upon at least one of said sensors being used or said carrier platform being used or said identification algorithms being used.

2. A system for carrying out a method of navigating within a track network according to claim 1, the system comprising:

a system central for administering network data representing a model of the track network;

a track maintenance machine configured as a rail vehicle for processing
navigation data derived from the network data;

a navigation device;

a communication device for data exchange between said system central and said navigation device;

a carrier platform having sensors for collecting raw data representing characteristic information of the track network; said system central configured to generate object data from the raw data by using identification algorithms; and a big data framework disposed in said system central for assigning probability values or probability functions to each object data in dependence upon at least one of said sensors being used or said carrier platform being used or said identification algorithms being used when evaluating the raw data and synchronizing the raw data with the network data.

3. The method according to claim 1, which further comprises, after performing an update of the network data, transferring all of the updated data or part of the updated data to a navigation device of a track maintenance machine configured as a rail vehicle.

4. The method according to claim 1, which further comprises carrying out an update of the network data by new object data in dependence on the assigned probability values or probability functions.

5. The method according to claim 1, which further comprises organizing the object data based on a detected motion pattern of a said carrier platform, to supply track objects represented by the object data being strung together as an object chain for synchronization with the network data stored as a graph.

6. The method according to claim 5, which further comprises subdividing the object chain into segments, and synchronizing a segment with the graph based on distinctive track objects.

7. The method according to claim 1, which further comprises using sensors disposed on a track maintenance machine to record surrounding track objects, and determining a current position of the track maintenance machine by synchronizing the recorded track objects with the network data.

* * * * *